Oct. 27, 1936.  W. A. ARNESEN  2,058,755
BATTERY BOX
Filed July 31, 1934
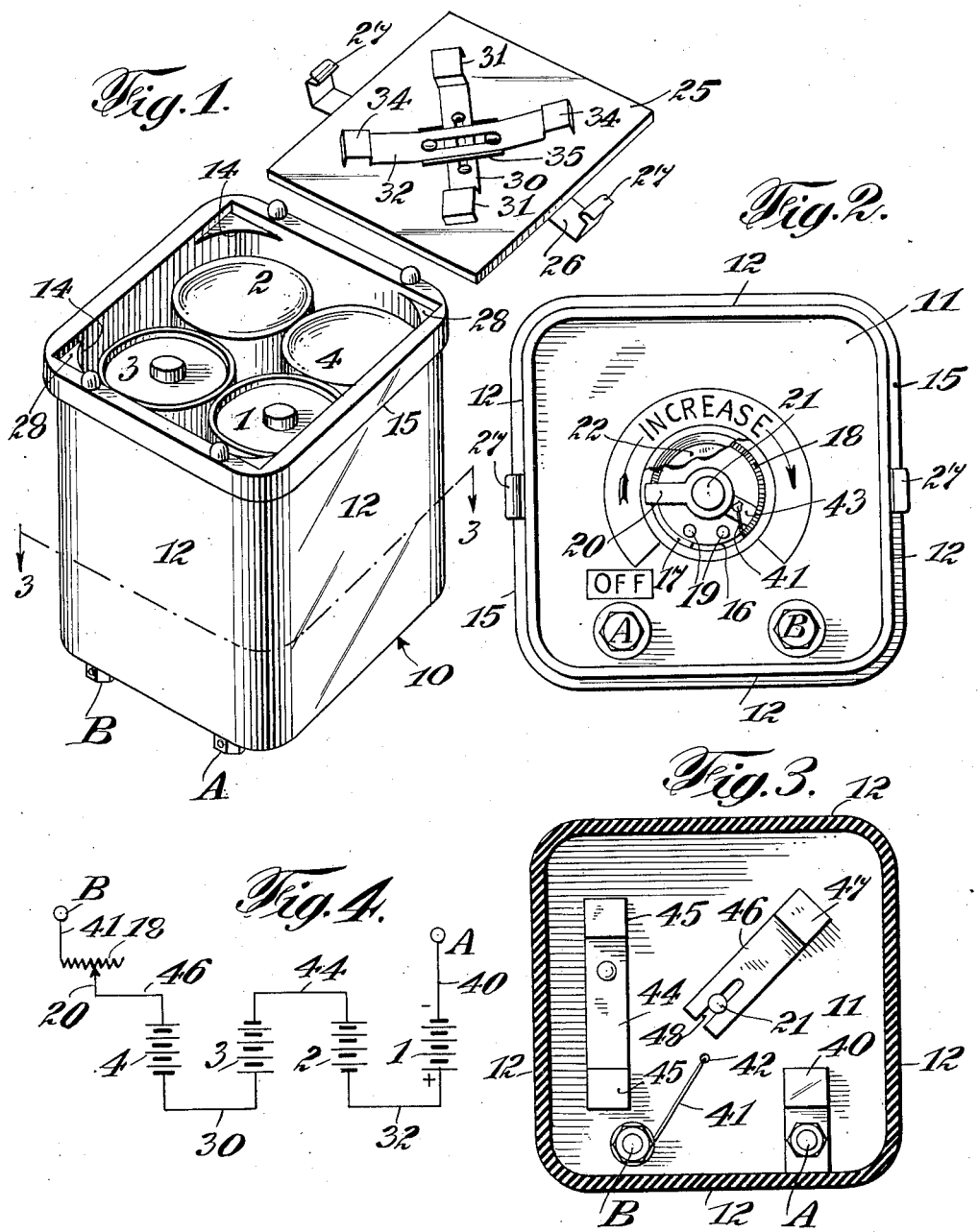
INVENTOR
Walter A. Arnesen
BY
Ramsey & Kent
his ATTORNEYS Patented Oct. 27, 1936

2,058,755

UNITED STATES PATENT OFFICE 2,058,755

BATTERY BOX

Walter A. Arnesen, New York, N. Y.

Application July 31, 1934, Serial No. 737,725

6 Claims. (Cl. 136—173)

This invention relates to improvements in battery boxes and more particularly to improvements in boxes for containing a plurality of batteries of the flash-light cell type adapted particularly for furnishing energy for transilluminators and other diagnostic instruments.

An object of the invention is to provide a new, simple, efficient box construction for containing and permitting the utilization of a plurality of flash-light cells.

Another object of the invention is to provide a battery box of such construction that the cells contained therein are connected in series when properly positioned in the box.

A further object of the invention is to provide a battery box of such construction that only one part, the bottom, is removable, which bottom is provided with conducting bridges arranged so as to insure proper connection of the cells regardless of how the bottom is locked to the box.

In achieving the objects of the invention, a battery box is constructed of molded insulating material, such as a phenol condensation product, in such fashion that the top and all four sides are formed integrally. The bottom is made as a separate flat plate of insulating material, and provision is made for locking the bottom to the casing, such provision consisting of a metallic strap extending across the lower surface of the bottom plate, and having its ends bent up and formed into hooks to snap over a shoulder around the casing near the bottom thereof. The top of the casing is provided with binding posts, one of which is connected directly to one end of a rheostat. The other binding post is connected to a terminal on the inner surface of the top of the casing. This inner surface of the casing top is also provided with bridge members for connecting certain cells together and for connecting another cell to the rheostat and the bottom plate is provided with brides so arranged that, in conjunction with the bridges inside the casing, cells when properly positioned in the box will be connected in series to the binding posts through the rheostat.

Other features, objects and advantages will be evident from the following detailed description of the accompanying drawing, wherein Fig. 1 is a perspective view of a battery box embodying the invention in inverted position with the bottom plate removed.

Fig. 2 is a top view of the battery box.

Fig. 3 is a section taken substantially on the lines 3—3 of Fig. 1; and

Fig. 4 is a circuit illustrating the manner in which the cells when properly positioned in the box are connected in series to the binding posts through the rheostat.

Referring now to the drawing, 10 indicates generally the integral casing composed of a top 11 and four sides 12. This casing is molded of some suitable insulating material, such as for example, a phenol condensation product. The inner corners of the walls 12 are rounded as indicated at 14 to insure proper positioning of battery cells within the casing. The sides 12 are provided near the bottom thereof with a shoulder 15 which is continuous around the entire casing. The top 11 has secured thereto and extending upwardly therefrom binding posts A and B. A groove 16 is formed in the surface of the top 11 for the reception of a strip of insulating material 17 on which is wrapped the turns 18 of a rheostat. Two pins 19 formed integrally with the top serve as stops for limiting movement of a rotatable arm 20 which bears against the turns 18 of the rheostat. This arm 20 is secured to a shaft 21 which extends through the top 11 and upon which may be mounted a knob 22, part of which is shown, for controlling rotation of the arm 20.

The casing is adapted to be closed by a bottom plate 25 also made of some suitable insulating material and having a metallic strap 26 secured thereto and extending across from one side to the other. The ends of the strap 26 are bent angularly and formed into fingers 27 which will engage over the shoulder 15. The strap is sprung so that engagement of the hooks 27 with the shoulder is facilitated. Position of the bottom plate 25 relative to the casing is also facilitated by means of the shoulders 28 which are formed by forming the rounded corners 14. Extending diagonally across the inner surface of the bottom 25 is a metallic bridge 30 having the ends sprung inwardly as at 31 in the shape of substantially flat terminals. Extending at right angles to the bridge 30 across the plate 25 is a second bridge 32 having the ends sprung inwardly and formed with flat contacting terminals 34. Since the bridge 32 crosses the bridge 30 it is insulated therefrom by a thin strip of insulating material 35.

Secured to the bottom surface of the top 11 is a contact member 40 in electrical engagement with the binding post A. The binding post B has secured thereto a conductor 41 which passes through an opening 42 in the casing and is secured to a terminal 43 of the rheostat windings 18. A bridge member 44 is secured in position as shown and has its end portions bent downwardly into flat contacts 45. A bowed bridge member 46 has a terminal extending downwardly as at 47 and has the opposite ends slotted as at 48 so that the edges of the slot can fit in a groove in the reduced shaft 21. This bridge 46 is preferably bowed somewhat so that the resiliency thereof holds the bridge in place within the casing, the surface of the casing being preferably provided with a slight indentation to aid in proper positioning.

The casing as shown is of such size as to hold four cells of the flash-light cell type. The various bridge members both on the bottom plate and secured to the underside of the top 11 are so arranged that if the cells are properly positioned in the casing they will be connected in series to the binding posts A and B through the rheostat winding 18. The proper position of the four cells is shown in Fig. 1 wherein cells 1 and 3 have their positive terminals facing the bottom plate 25 while cells 2 and 4 have their negative terminals facing the bottom plate 25. The position of the two groups of cells, namely 1 and 3 and 2 and 4 may be reversed so that the negative terminals of 1 and 3 face the bottom plate while the positive terminals of 2 and 4 face the bottom plate. The relative positions of cells 1 and 3 is determined by binding posts A and B, it being essential, on account of the bridge arrangement, to have the cells which are under these two binding posts so arranged that similar terminals are similarly positioned. With the cells in position as shown, the circuit is substantially as follows: The binding post A becomes the negative terminal of the hook-up due to contact of the negative terminal of cell 1 with the contact 40. The various bridge members and the cells are shown in their circuit arrangement in Fig. 4. With the bottom plate in position closing the box, the positive terminal of cell 1 is connected to the negative terminal of cell 2 by means of the bridge 32. The positive terminal of cell 2 is connected to the negative terminal of cell 3 by the bridge 44. The positive terminal of cell 3 is connected to the negative terminal of cell 4 by the bridge 30. The positive terminal of cell 4 is connected to the shaft 21 and hence to the arm 20 by means of the bridge 46. The arm 20 of course makes connection with the binding post B through the windings 18 of the rheostat and the conductor 41. It is immaterial how bottom plate 25 is positioned to close the casing relative to the binding posts A and B, since crossed bridges 30 and 32 extending diagonally of the bottom plate and at right angles to each other insure that bridging between cells 1 and 2 and between cells 3 and 4 will always take place. If the position of the cells in the groups 1 and 3 and 2 and 4 is reversed as before explained, naturally, the binding post A will become the positive terminal and the position post B will become the negative terminal.

From the foregoing it will be seen that the present invention provides a battery box of unique construction occupying the minimum of space and permitting the utilization of a number of cells in series. The device is of the utmost simplicity since the only requirement as to conditions to be observed is that the two cells directly under the binding post shall have their terminals facing in the same direction while the other two cells shall have corresponding terminals facing in the opposite direction. The bottom plate can be quickly removed by merely disengaging the hooks 27 from the shoulder 15 and as quickly replaced without any attention being paid to the position of the hooks relative to the binding posts. The shoulder 15 extends entirely around the casing so that a locking zone is provided on all four sides.

It is to be understood that modifications of the invention are entirely possible, and, accordingly, such limitations as are imposed upon the invention are to be those set forth in the following claims.

I claim:

1. A battery box of the type described comprising an open bottom casing of insulating material, terminals secured to said casing, the interior of said casing being shaped to hold cells in quadrantal disposition, a bottom plate, means for securing said bottom plate to said casing, conductive bridges secured to the bottom surface of the top of the casing, and a pair of crossed conductive bridges secured to said bottom plate diagonally thereacross, said bridges being insulated one from the other, the bridges within the casing and bottom plate cooperating to connect cells in the casing in series between said terminals.

2. A battery box of the type described comprising an open bottom casing of insulating material, terminals secured to said casing, the interior of said casing being shaped to hold cells in quadrantal dispostion, a bottom plate, means for securing said bottom plate to said casing, conductive bridges secured to the bottom surface of the top of the casing, and a pair of crossed conductive bridges secured to said bottom plate, the bridges within the casing and bottom plate cooperating to connect the cells in the casing in series between said terminals, the crossed bridges secured to said bottom plate extending diagonally thereof whereby the terminals of diagonally opposite cells in said casing will always be connected together regardless of the relative position of said bottom to said casing, said crossed bridges being insulated one from the other.

3. A battery box of the type described comprising an open bottom casing of insulating material, terminals secured to said casing, the interior of said casing being shaped to hold cells in quadrantal disposition, a bottom plate, means for securing said bottom plate to said casing, conductive bridges secured to the bottom surface of the top of said casing, a pair of crossed bridges secured to said bottom plate diagonally thereof and in insulated relation to each other, the bridges within the casing and on the bottom plate cooperating to connect cells in the casing in series between said terminals when the cells are properly positioned in the casing with one pair in inverted position relative to the other pair.

4. A battery box of the type described comprising an open bottom casing of insulated material, terminals secured to said casing, the interior of said casing being shaped to hold cells in quadrantal disposition with one pair of cells in inverted position relative to the second pair, a contact bridge secured to the bottom surface of the top of the casing to connect a terminal of a cell in the first pair to a terminal of a cell in the second pair, a pair of contact bridges secured to the bottom surface of the top of said casing, one of said contact bridges serving to connect a terminal of the other cell of the first pair with a casing terminal, and the other thereof serving to connect a terminal of the other cell of the second pair with the other casing terminal, a bottom plate, means for removably securing the bottom plate to the casing, and a pair of crossed conductive bridges secured to said bottom plate to extend diagonally thereof in insulated relation one to the other, said crossed bridges contacting with terminals of cells in said casing and cooperating with the bridges in the casing to connect properly positioned cells in series between said casing terminals.

5. A battery box of the type described comprising an open bottom casing of insulated material, terminals secured to said casing, a rheostat secured to said casing, the interior of said casing being shaped to hold cells in quadrantal disposition with one pair of cells in inverted position relative to the second pair, a contact bridge secured to the bottom surface of the top of the casing to connect a terminal of a cell in the first pair to a terminal of a cell in the second pair, a pair of contact bridges secured to the bottom surface of the top of said casing, one of said bridges serving to connect a terminal of the other cell of the first pair with a casing terminal and the other thereof serving to connect a terminal of the other cell in the second pair with the other casing terminal through said rheostat, a bottom plate, means for removably securing the bottom plate to the casing, and a pair of crossed conductive bridges secured to said bottom plate to extend diagonally thereof in insulated relation one to the other, said crossed bridges contacting with terminals of cells in said casing and cooperating with the bridges in the casing to connect properly positioned cells in series between said casing terminals through said rheostat.

6. A battery box of the type described comprising a symmetrically-walled open bottom casing of insulating material, terminals secured to said casing, a completely detachable flat bottom plate of insulating material shaped to close the open bottom of said casing in any of more than two positions relative thereto wherein the bottom conforms to the symmetry of the casing, means for locking the bottom to the casing in any of its said relative positions, contact bridges secured to the bottom surface of the top of said casing, and contact bridges secured to a surface of said bottom, said bridges cooperating to connect cells properly positioned in the casing in series between said terminals regardless of the relative position of the bottom locked to the casing.

WALTER A. ARNESEN.